United States Patent [19]
Yamato

[11] Patent Number: 5,986,674
[45] Date of Patent: Nov. 16, 1999

[54] THREE-DIMENSIONAL GAME APPARATUS AND INFORMATION STORAGE MEDIUM

[75] Inventor: Noboru Yamato, Kawasaki, Japan

[73] Assignee: Namco. Ltd., Tokyo, Japan

[21] Appl. No.: 08/958,247

[22] Filed: Oct. 27, 1997

[30] Foreign Application Priority Data

Oct. 31, 1996 [JP] Japan .................................. 8-305626

[51] Int. Cl.$^6$ .................................................. G06F 15/00
[52] U.S. Cl. ............................................................ 345/441
[58] Field of Search ................................... 345/419, 433, 345/441, 420, 421, 422

[56] References Cited

U.S. PATENT DOCUMENTS 5,524,187  6/1996  Feiner et al. ............................. 345/419
5,675,720  10/1997  Sato et al. ................................ 345/420

Primary Examiner—Phu K. Nguyen
Attorney, Agent, or Firm—Oliff & Berridge, PLC

[57] ABSTRACT

It is an object to provide a three-dimensional game apparatus and information storage medium which can display an object located at a position nearer a viewpoint to improve the reality in an image. It is judged whether or not a first object (or polygon or curved surface) is located at a position near the viewpoint. When the first object is located at the position near the viewpoint, a second object which is N times as large as the first object is located at a position spaced away from the viewpoint by L2=N×L1. The above judgment is performed based on whether or not the length L1 or depth coordinate Z1 of a vector is equal to or less than a given value. The drawing priority is determined by using 1/N of the depth coordinate of the second object or a second polygon or by using the depth coordinate of the first object or a first polygon. The shape data of the second object N times as large as the first object has been previously provided. The distance between a vertex and the viewpoint may be magnified N times when the vertex approaches the viewpoint.

24 Claims, 17 Drawing Sheets

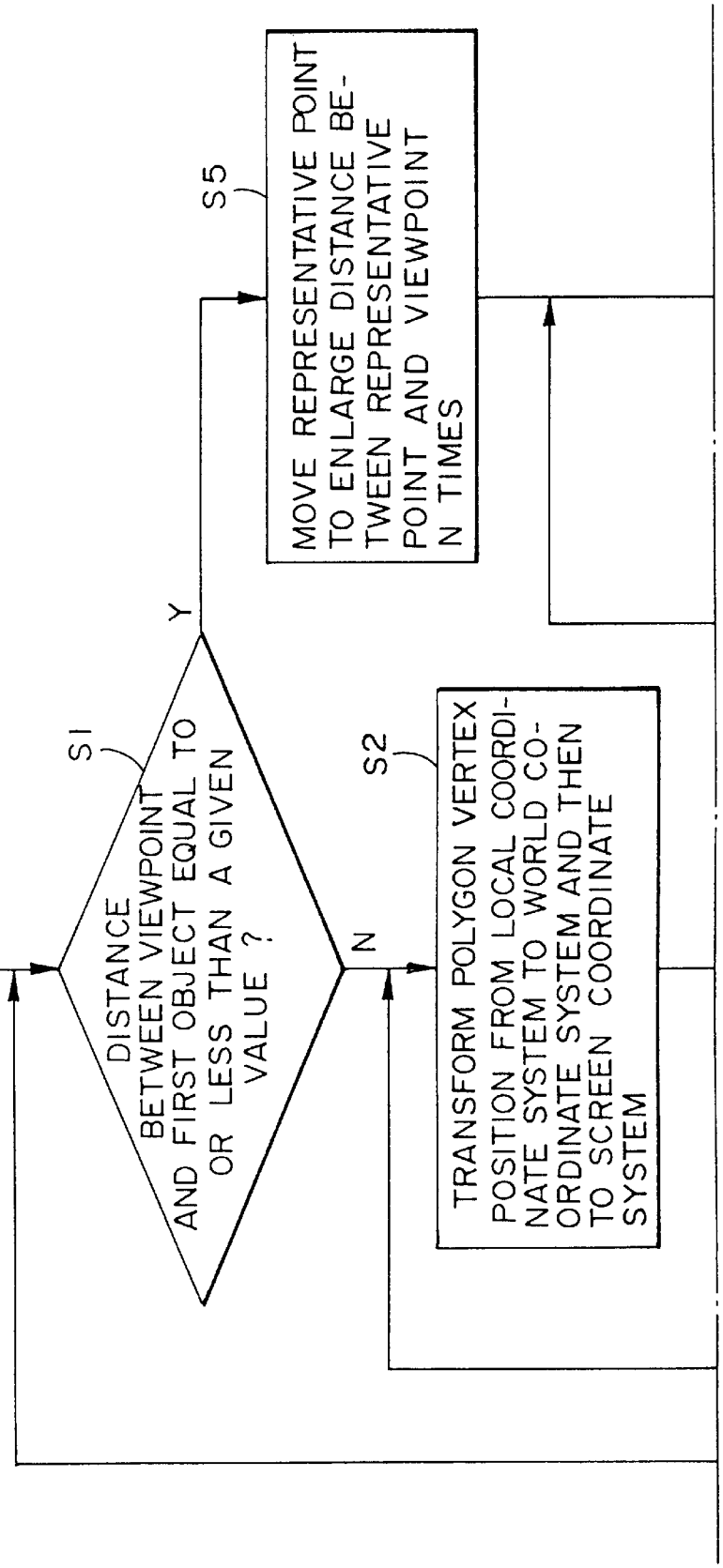

FIG.9A

| OBJECT NUMBER | POSITIONAL DATA OF OBJECT (REPRESENTATIVE POINT) | DIRECTIONAL DATA OF OBJECT |
|---|---|---|
| 1 | X1, Y1, Z1 | $\rho_1, \varphi_1, \theta_1$ |
| 2 | X2, Y2, Z2 | $\rho_2, \varphi_2, \theta_2$ |
| --- | --- | --- |

FIG.9B

| OBJECT NUMBER | POSITIONAL DATA OF VERTEX IN LOCAL COORDINATE SYSTEM | POSITIONAL DATA OF VERTEX FOR ENLARGING OBJECT IN LOCAL COORDINATE SYSTEM | COLOR DATA, TEXTURE COORDINATE DATA | POSITIONAL DATA OF VERTEX IN SCREEN COORDINATE SYSTEM | DATA OF DEPTH COORDINATE (DRAWING PRIORITY) |
|---|---|---|---|---|---|
| 1 | x1,y1,z1 ~ x4,y4,z4 | x1,y1,z1 ~ x4,y4,z4 | R,G,B,U,V | x1,y1 ~ x4,y4 | Z1 |
|   | x1,y1,z1 ~ x4,y4,z4 | x1,y1,z1 ~ x4,y4,z4 | R,G,B,U,V | x1,y1 ~ x4,y4 | Z2 |
|   | x1,y1,z1 ~ x4,y4,z4 | x1,y1,z1 ~ x4,y4,z4 | R,G,B,U,V | x1,y1 ~ x4,y4 | Z3 |
| 2 | x1,y1,z1 ~ x3,y3,z3 | x1,y1,z1 ~ x3,y3,z3 | R,G,B,U,V | x1,y1 ~ x3,y3 | Z4 |
|   | x1,y1,z1 ~ x3,y3,z3 | x1,y1,z1 ~ x3,y3,z3 | R,G,B,U,V | x1,y1 ~ x3,y3 | Z5 |
|   | x1,y1,z1 ~ x3,y3,z3 | x1,y1,z1 ~ x3,y3,z3 | R,G,B,U,V | x1,y1 ~ x3,y3 | Z6 |
|   | x1,y1,z1 ~ x4,y4,z4 | x1,y1,z1 ~ x4,y4,z4 | R,G,B,U,V | x1,y1 ~ x4,y4 | Z7 |
| --- | --- | --- | --- | --- | --- |

LOCAL COORDINATE SYSTEM

WORLD COORDINATE SYSTEM

THREE-DIMENSIONAL GAME APPARATUS AND INFORMATION STORAGE MEDIUM

BACKGROUND OF THE INVENTION

1. Field of Industrial Application

The present invention relates to a three-dimensional game apparatus which can synthesize a view image within an object space at a given viewpoint, and an information storage medium therefor.

2. Description of the Prior Art

There is known a three-dimensional game apparatus which synthesizes a view image from a plurality of objects at a given viewpoint, these objects being arranged in an object space that is a virtual three-dimensional space. Such a game apparatus is popular for such a reason that players can experience a so-called virtual reality. Such a three-dimensional game apparatus may synthesize a view image viewable from a viewpoint 910 by perspectively projecting an object 900 onto a screen 912, as shown in FIG. 16A.

However, it has been found that such a three-dimensional game apparatus had the following problem. It is now assumed, for example, that an object 902 is located between the viewpoint 910 and the screen 912 as shown in FIG. 16B. In this case, a problem may be raised in that the displayed object 902 is distorted due to restrictions of hardware in the three-dimensional game apparatus. One of techniques for avoiding such a problem may be that the object 902 located at such a region will be out of display. However, such a technique may highly degrade the reality in the image since any object nearer the viewpoint will not be displayed.

SUMMARY OF THE INVENTION

In view of the above problem of the prior art, an object of the present invention is to provide a three-dimensional game apparatus which can display any object nearer the viewpoint to improve the reality in the image, and an information storage medium therefor.

To this end, the present invention provides a three-dimensional game apparatus for synthesizing a view image at a given viewpoint within an object space in which objects are arranged, the apparatus comprising:

means for judging whether or not any one of a first object, a first polygon defining the first object and a first curved surface defining the first object is located at a position near the viewpoint;

means for locating any one of a second object, a second polygon and a second curved surface at another position spaced away from the viewpoint by a second distance when it is judged that any one of the first object, the first polygon and the first curved surface is located at the position near the viewpoint, the second object, the second polygon and the second curved surface being N times as large as the first object, the first polygon and the first curved surface, the second distance being N times as long as a first distance between the viewpoint and any one of the first object, the first polygon and the first curved surface; and means for synthesizing a view image including the images of the objects.

It is first judged whether or not the first object or the like is located at the position near the viewpoint. For example, it may be judged whether or not the length or depth coordinate of a vector connecting the viewpoint with the first object is equal to or less than a given value, or whether or not part of the first object meets the screen. When the first object or the like is located at the position near the viewpoint, the second object or the like N times as large as the first object or the like is located at another position spaced away from the viewpoint by the second distance N times as long as the first distance that is the original distance. Thus, for example, a problem raised by locating an object in a region between the viewpoint and the screen can be overcome. Further, an object located very near the viewpoint can be displayed. This can highly improve the reality in the image.

Any one of the second object, second polygon and second curved surface may be located so that the terminal point of a second vector is positioned at a representative point of any one of the second object, the second polygon and the second curved surface when it is judged that any one of the length and the depth coordinate of a first vector is equal to or less than a given value, the first vector including the viewpoint as a starting point and including the representative point of any one of the first object, first polygon and first curved surface as a terminal point, the second vector including the viewpoint as a starting point and having the same direction as that of the first vector and having the length N times as long as that of the first vector.

The second object or the like may be located so that the terminal point of the second vector which is N times as long as the first vector is positioned at the representative point of the second object or the like, when the length of depth coordinate of the first vector is equal to or less than the given value. Thus, the second object or the like can be arranged merely by processing the representative point. This can simplify the process with increased speed.

Any one of the second object, second polygon and second curved surface may be drawn with substantially the same drawing priority as that of any one of the first object, first polygon and first curved surface.

Thus, a view image having its properly removed hidden surfaces can be provided even if any other object is located between the first object or the like and the second object or the like.

In such a case, it is desirable that the drawing may be performed based on a depth coordinate 1/N times the depth coordinate of any one of the second object, second polygon and second curved surface, or based on the depth coordinate of any one of the first object, first polygon and first curved surface.

Any one of the second object, second polygon and second curved surface formed based on the previously provided shape data may be located at a position spaced away from the viewpoint by the second distance.

Thus, it can be eliminated to enlarge the first object or the like, resulting in increase of the processing speed.

Any one of the first object, first polygon and first curved surface may be moved to a position spaced away from the viewpoint by the second distance, and at the same time, enlarged N times.

Thus, the memory capacity can be saved since it is not required to previously provide the shape data of the second object or the like N times as large as the first object or the like.

The present invention also provides a three-dimensional game apparatus for synthesizing a view image at a given viewpoint within an object space in which objects are arranged, the apparatus comprising:

means for judging whether or not the vertex of any one of a first object, a first polygon defining the first object and a first curved surface defining the first object is located at a position near the viewpoint;

means for moving the vertex so that the distance between the vertex and the viewpoint becomes N times as long as the original distance when it is judged that the vertex is located at a position near the viewpoint; and means for synthesizing a view image including the images of the objects.

It is judged whether or not the vertex of the first object or the like is located at a position near the viewpoint. When it is positioned near the viewpoint, the vertex is moved so that the distance between the moved vertex and the viewpoint becomes N times as long as the original distance. Thus, the second object or the like defined by the moved vertex can be used to provide a proper view image. As a result, a problem such as raised by locating an object in a region between the viewpoint and the screen may be overcome. At the same time, any object very near the viewpoint can be displayed. This can highly improve the reality in the image.

The vertex may be moved to the terminal point of a fourth vector when it is judged that any one of the length and the depth coordinate of a third vector is equal to or less than a given value, the third vector including the viewpoint as a starting point and including a point specified by the vertex as a terminal point, the fourth vector including the viewpoint as a starting point and having the same direction as that of the third vector and having the length N times as long as that of the third vector.

The movement of the vertex can be simplified by moving the vertex of the first object or the like to the terminal point of the fourth vector which is N times as long as the third vector when the length or the depth coordinate of the third vector is equal to or less than the given value.

Any one of a second object, second polygon and second curved surface which is defined by the moved vertex may be drawn with substantially the same drawing priority as that of any one of the first object, first polygon and first curved surface.

Thus, a view image with properly removed hidden surfaces can be provided even if the vertex is moved to a position farther than the viewpoint.

BRIEF DESCRIPTION OF THE DRAWINGS

FIGS. 7A and 7B is a flowchart illustrating the detailed operational steps of this embodiment.

FIGS. 9A and 9B are table data to be used in this embodiment.

DETAILED DESCRIPTION OF THE PREFERRED EMBODIMENTS

The present invention will now be described, by way of example, with reference to the drawings.

Figure 1:
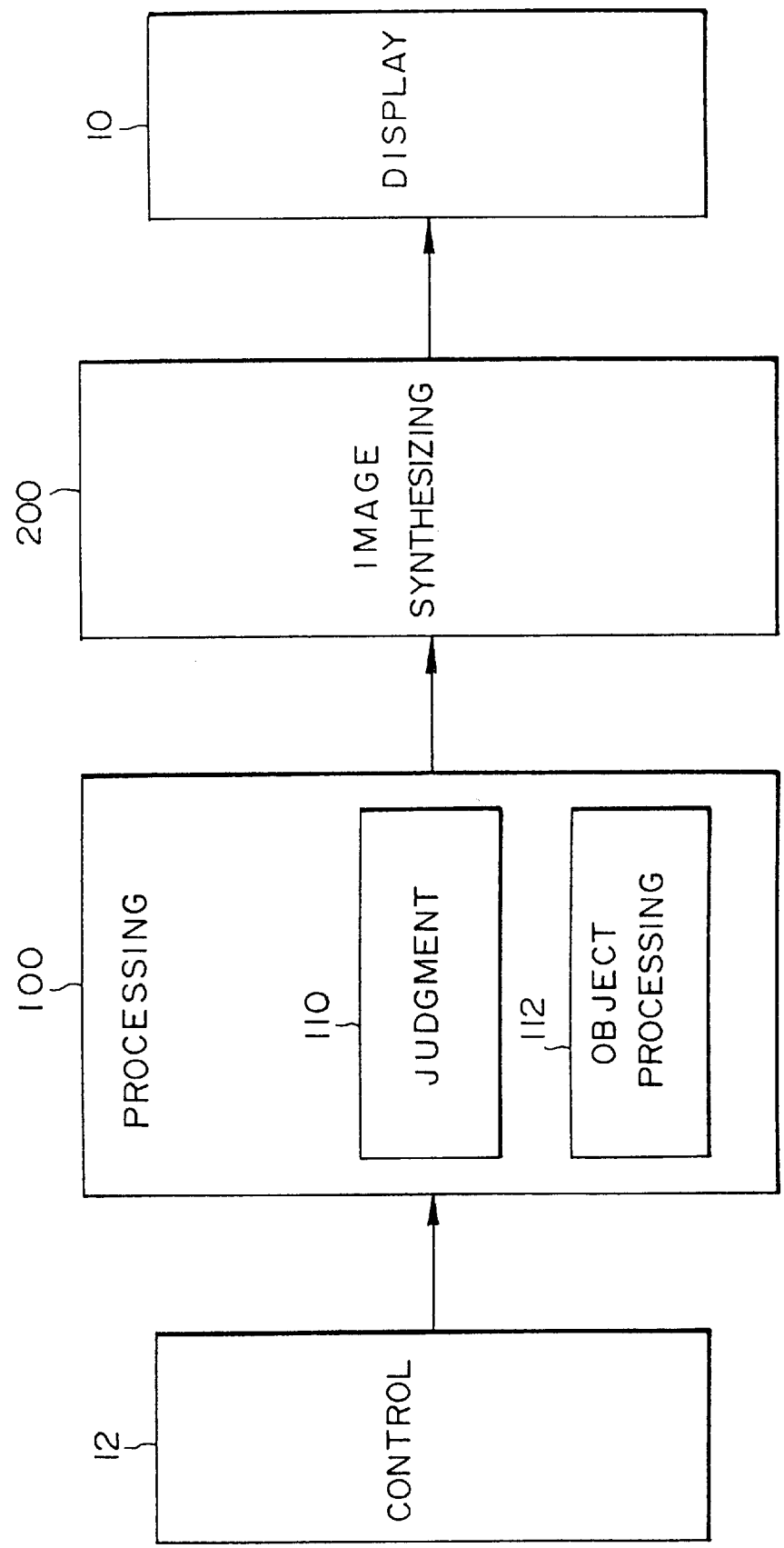
FIG. 1 is a functional block diagram of one embodiment of the present invention.

FIG. 1 is a functional block diagram of one embodiment of the present invention. There is provided a control section 12 through which a player performs the input of control information by operating such as a lever, button and so on. The control information from the control section 12 is then inputted into a processing section 100 which performs various processings such as execution of programs, setting of various different modes, location of various displayed objects, setting of background and other processing's in accordance with the control information, a given program or the like. The functions of the processing section 100 are realized by various hardware such as CPU and memories. An image synthesizing section 200 synthesizes a view image (or game image) at a given viewpoint within an object space where various objects such as game characters, moving bodies, maps and stationary objects are arranged on the basis of the processing results in the processing section 100. The functions of the image synthesizing section 200 are realized by a hardware such as image synthesizing IC and memories or CPU and memories. An image synthesized by the image synthesizing section 200 is outputted toward a display 10 in which the image is displayed.

The processing section 100 comprises a judgment section 110 and an object processing section 112. In this embodiment, the judgment section 110 judges whether or not a first object is located at a position near the viewpoint. If the first object is located at the position near the viewpoint, the object processing section 112 locates a second object which is N times as large as the first object (wherein N is a real number) at another position spaced away from the viewpoint by a second distance N times a first distance (which is a distance between the first object and the viewpoint). Instead of the first and second objects, first and second polygons defining the first and second objects or first and second curved surfaces defining the first and second objects may be processed in accordance with the present invention.

Figure 2:
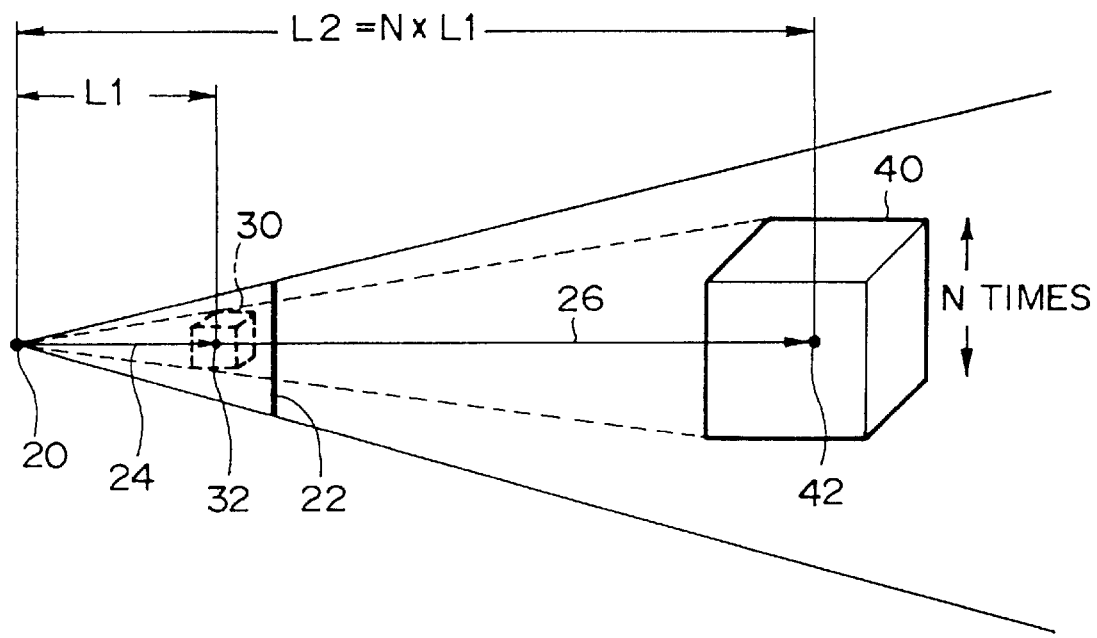
FIG. 2 illustrates the technique of this embodiment.

More particularly, for example, the judgment section 110 judges whether or not the length L1 of a vector 24 (first vector) including the viewpoint 20 as a starting point and the representative point 32 of a first object 30 as a terminal point is equal to or less than a given value, as shown in FIG. 2. When the length L1 of the vector 24 is equal to or less than the given value, the object processing section 112 performs the following process. It is now assumed that there is a vector 26 (second vector) including the viewpoint 20 as a starting point and having the same direction as that of the vector 24 and a length N times (4 times in the case of FIG. 2) larger than that of the vector 24. Thus, the object processing section 112 locates a second object 40 having its magnitude N times larger than that of the first object 30 so that the terminal point of the vector 26 becomes the representative point 42 of the second object 40. In other words, the second object 40 having its magnitude N times larger than that of the first object 30 is located at the representative point 42 spaced away from the viewpoint 20 by L2=N×L1. The image synthesizing section 200 then generates a perspectively projected image of the second object 40 instead of generating a perspectively projected image of the first object 30 to output toward the display 10.

In such a manner, the first object 30 which is located in the region between the viewpoint 20 and the screen 22 can be properly displayed. Namely, the second object 40 will be located at the representative point 42 and out of the region between the viewpoint 20 and the screen 22. Thus, the problem of a distorted image which would be created when an object is located between the viewpoint 20 and the screen 22 can be overcome. Since the second object 40 has its magnitude N times larger than that of the first object 30, the perspectively projected image of the second object 40 on the screen 22 is identical with that of the first object 30 on the screen 22. Therefore, the player will see the first object 30 just as it is at the representative point 32. As a result, an object located very near the viewpoint can be displayed. This can highly improve the reality in the image.

Figure 3A:
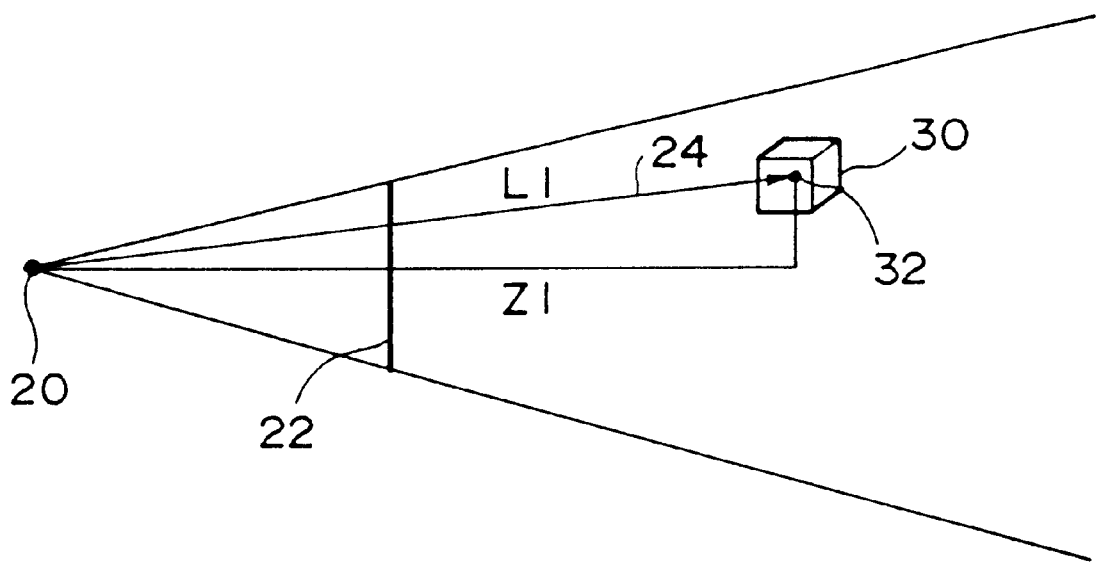
FIGS. 3A and 3B illustrate various techniques for judging whether or not a first object approaches the viewpoint.

In FIG. 2, it is judged whether or not the first object 30 is located near the viewpoint 20, based on the length L1 of the vector 24. Besides, as shown in FIG. 3A, the judgment may be performed based on the depth coordinate Z1 of the vector 24 when its origin is at the viewpoint 20. Any other techniques such as detecting a meet between the first object 30 and the screen 22 may also be used. It should be noted that the length L1 of the vector 24 can be easily determined from the positional data of the viewpoint 20 and representative point 32. On the other hand, the calculation of the depth coordinate Z1 of the vector 24 requires an calculation processing associated with the direction of the viewpoint and so on. The judgment based on the length L1 is therefore advantageous for easier calculation processing.

Figure 3B:
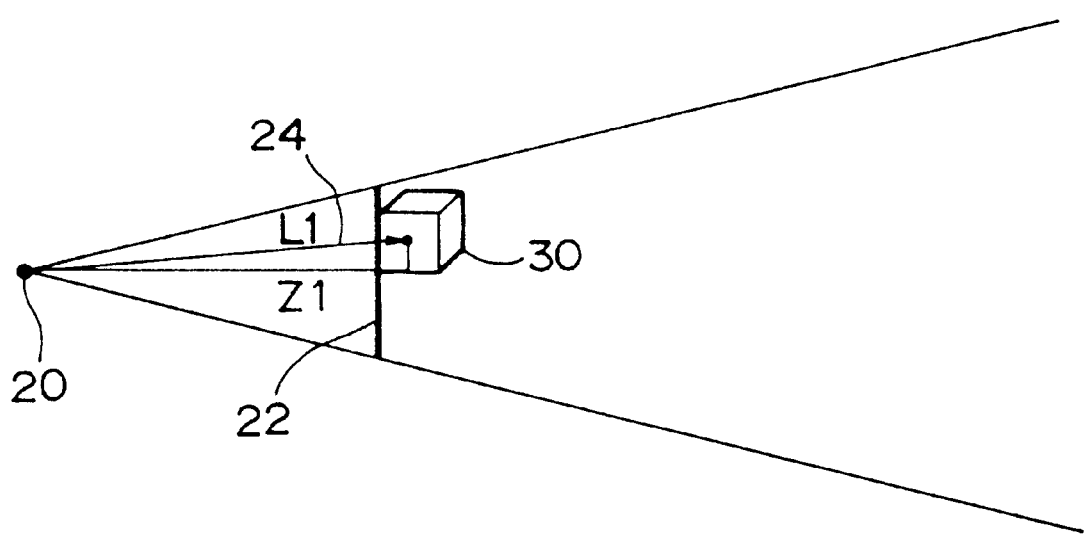

It is also desirable that given values of L1 and Z1 are equal to or larger than the values of L1 and Z1 provided when at least part of the first object 30 traverses beyond the screen 22, as shown in FIG. 3B. Thus, an image can be properly displayed even in such a three-dimensional game apparatus that the image will be distorted when the first object 30 partially traverses beyond the screen 22. For example, the given value of Z1 may be slightly larger than the distance between the viewpoint 20 and the screen 22, as in the given value of L1.

Figure 4A:
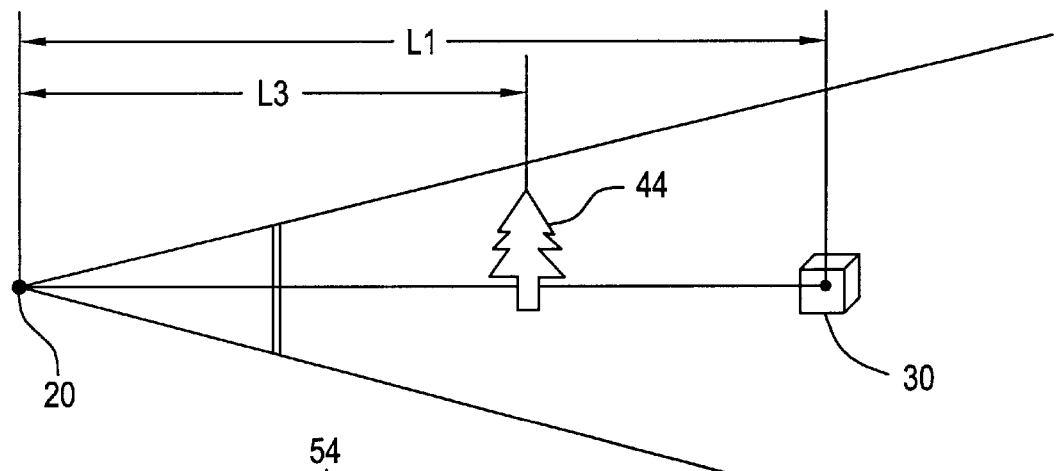
FIGS. 4A to 4D illustrate the removal of a hidden surface in the drawing process.
Figure 4B:
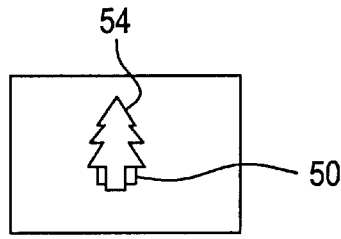
Figure 4C:
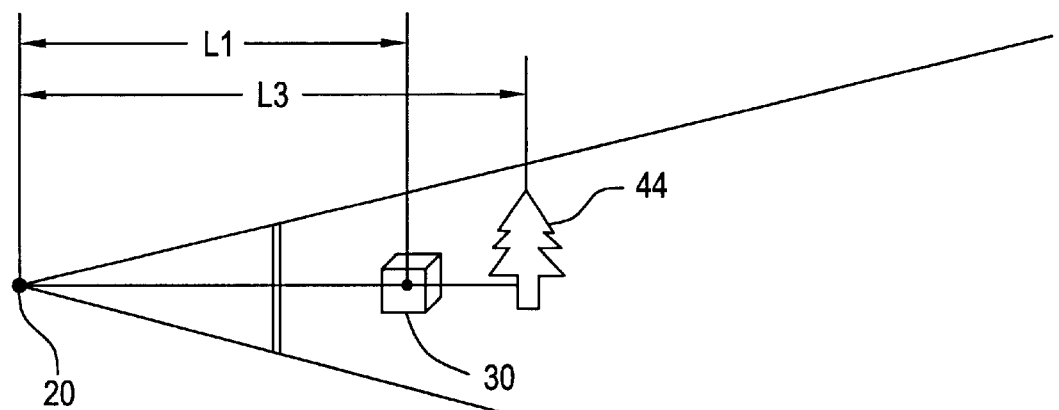
Figure 4D:
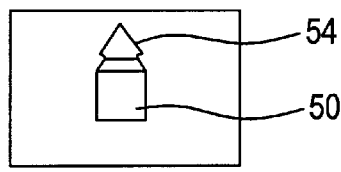

In the three-dimensional game apparatus of such a type, for example, it is now assumed that the distance L1 between the viewpoint 20 and the first object 30 is longer than the distance L3 between the viewpoint 20 and a third object 44, as shown in FIG. 4A. In such a case, the projected image 54 of the third object 44 will be overwritten on the projected image 50 of the first object 30 to synthesize a view image, as shown in FIG. 4B. On the other hand, when the distance L1 is shorter than the distance L3 as shown in FIG. 4C, the projected image 50 of the first object 30 will be overwritten on the projected image 54 of the third object 44 to synthesize a view image, as shown in FIG. 4D.

Figure 5A:
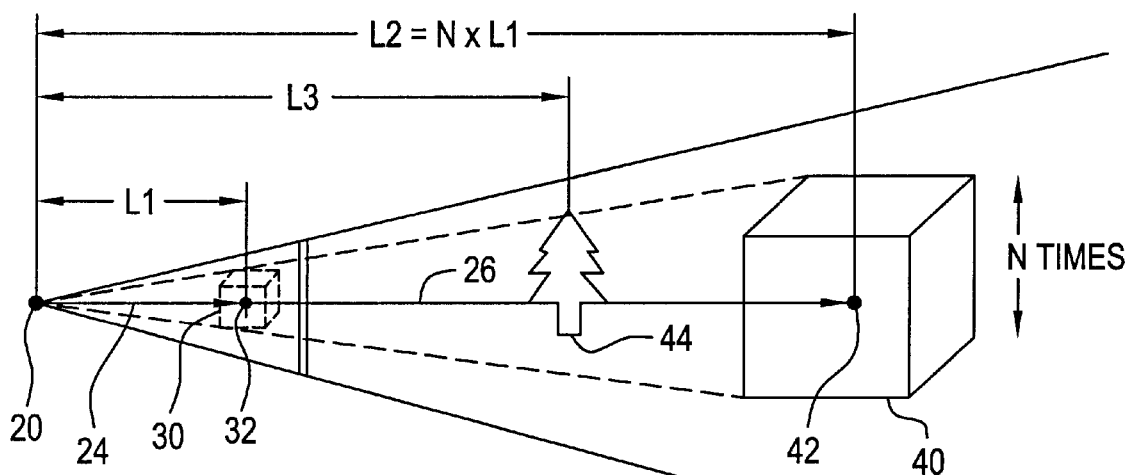
FIGS. 5A, 5B and 5C illustrate a technique in which the drawing priority is uniquely determined to provide a proper view image.
Figure 5B:
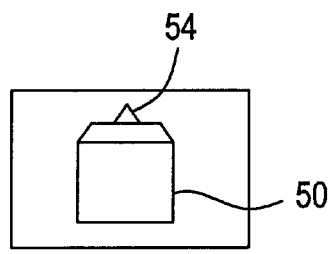
Figure 5C:
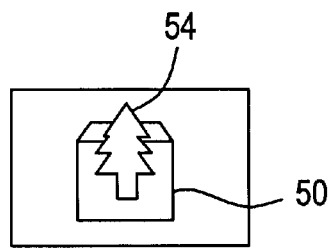

In this embodiment, the second object 40 is located at a position spaced away from the viewpoint 20 by L2=N×L1, as shown in FIG. 5A. Thus, a problem is raised in how manner the drawing priority between the second object 40 and the third object 44 should be handled. More particularly, such a view image as shown in FIG. 5B must be actually generated since the first object 30 is located at a position nearer the viewpoint 20 than the third object 44. However, such a view image as shown in FIG. 5C will be undesirably synthesized when the drawing is carried out directly with the drawing priority for the second object 40.

In this embodiment, therefore, the second object 40 or second polygon or second curved surface is drawn with substantially the same drawing priority (visible surface determination priority) as that of the first object 30 or first polygon defining the first object 30 or first curved surface defining the first object 30. By doing this, such a proper view image as shown in FIG. 5B can be provided even when the first, second and third objects 30, 40, 44 are in such a positional relationship as shown in FIG. 5A.

Figure 6A:
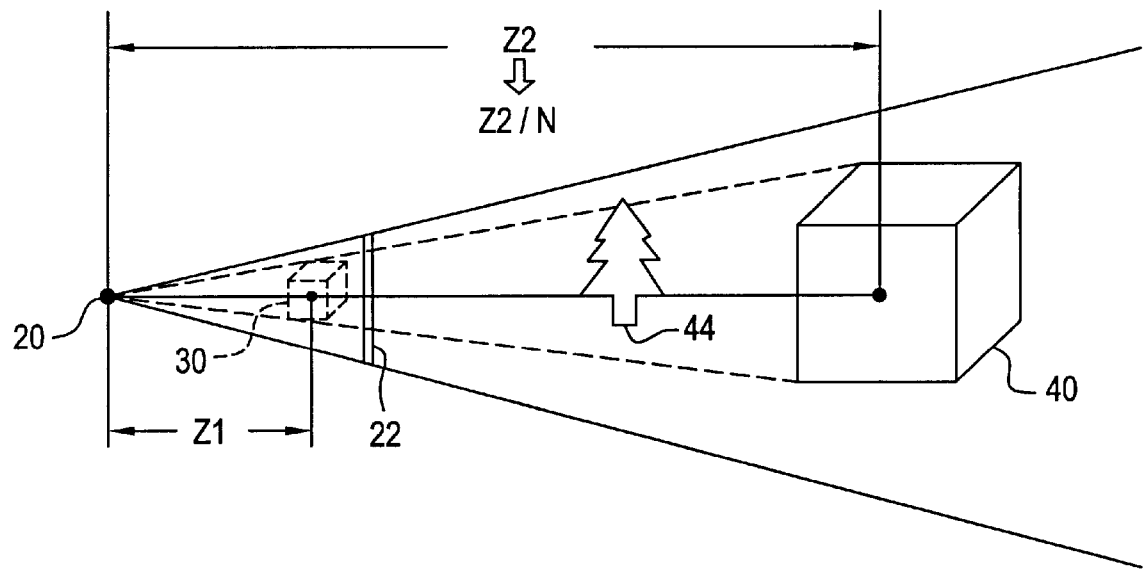
FIGS. 6A and 6B illustrate another technique in which the drawing priority is uniquely determined to provide a proper view image.
Figure 6B:
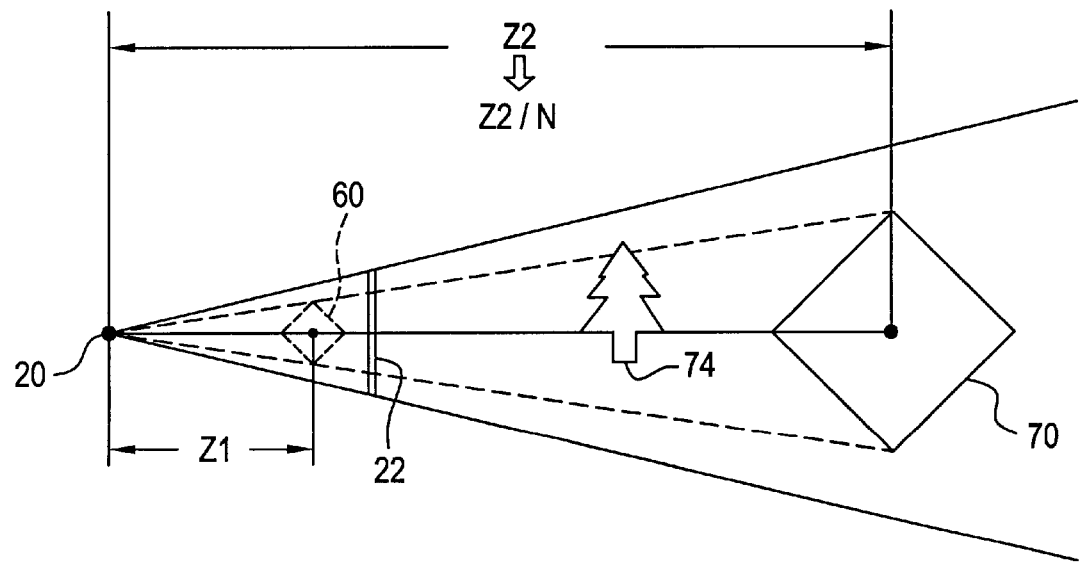

More particularly, for example, the drawing is performed on the basis of a depth coordinate Z2/N that is 1/N times the depth coordinate Z2 of the second object 40 or the second polygon 70 (or curved surface), as shown in FIGS. 6A and 6B. Thus, even if the distance between the viewpoint 20 and the second object 40 or the second polygon 70 becomes N times larger, such a proper view image as shown in FIG. 5B can be obtained since the depth coordinate used to determine the drawing priority is 1/N.

The technique that draws the second object 40 or the like with substantially the same drawing priority as that of the first object 30 or the like is not limited to the aforementioned process. For example, any other techniques such as performing the drawing based on the depth coordinate Z1 of the first object 30 or a first polygon 60 (or curved surface) as shown in FIGS. 6A and 6B may be similarly used in the present invention. By using the depth coordinate Z1 of the first object 30 or polygon 60, such a proper view image as shown in FIG. 5B can be obtained even if the first, second and third objects (30, 40, 44) or the first, second and third polygons (60, 70, 74) are in such a positional relationship as shown in FIGS. 6A and 6B. This is because the depth coordinate Z1 of the first object 30 or the first polygon 60 is smaller than the depth coordinate Z2 of the third object 44 or the third polygon 74.

Figure 7B:
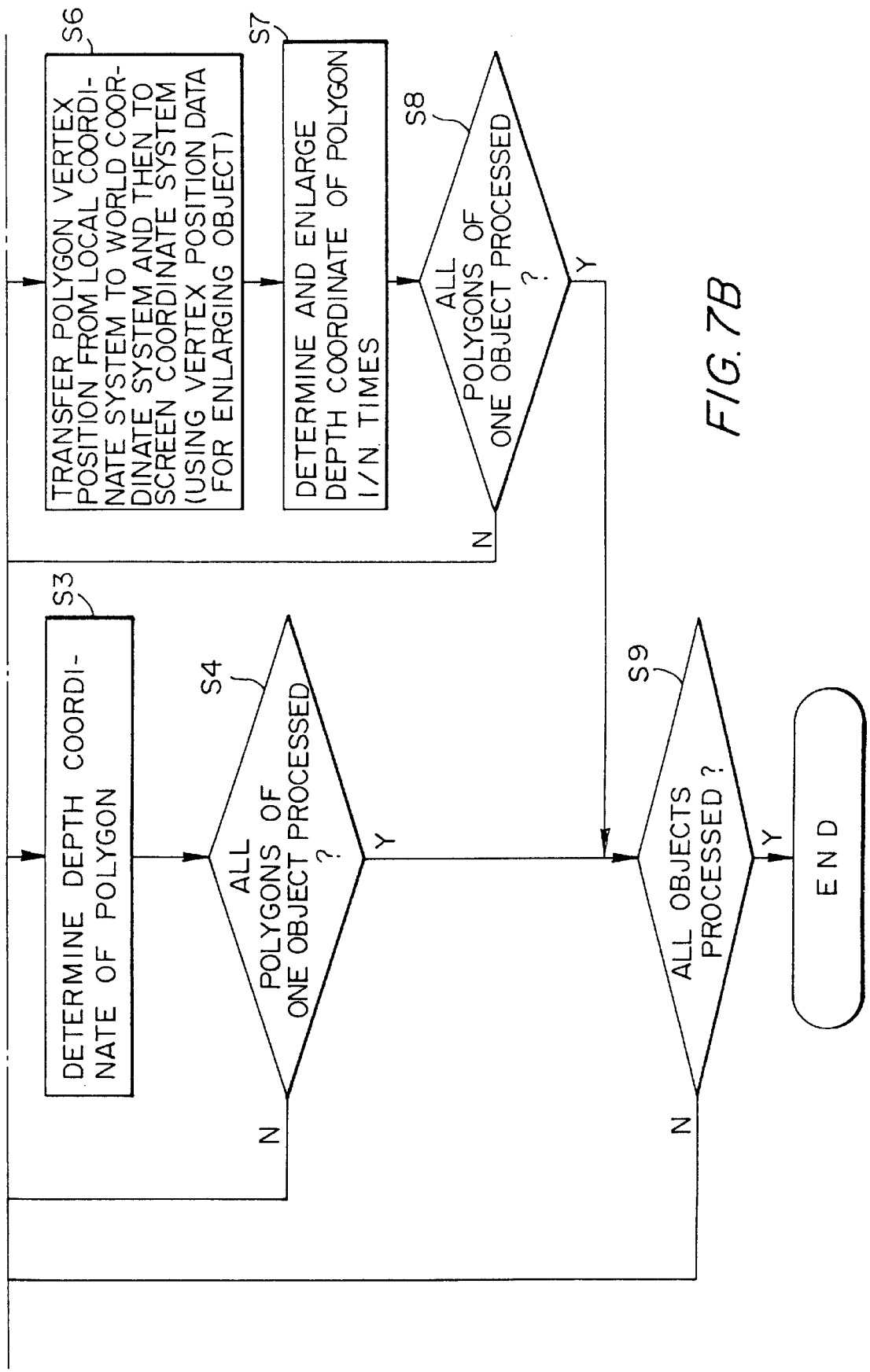

A detailed operation of this embodiment will be explained using flowcharts shown in FIGS. 7 and 8.

First of all, it is judged whether or not the distance (length of the vector 24) between the viewpoint 20 and the first object 30 (representative point 32) is equal to or less than a given value (step S1). The judgment is carried out by the judgment section 110 of FIG. 1. At this time, the positional data (positional data of representative points) and directional data of the each object are computed in real time for each frame, based on the control information from the player, a given program and so on. The results are stored in a given storage means within the game apparatus in the form of such a table date as shown in FIG. 9A. The distance L1 between the viewpoint 20 and the first object 30 will then be computed based on the positional data of the viewpoint 20 and also the positional data of the first object 30 included in the table data. In the step S1 of FIG. 7, any other technique such as judging whether or not the depth coordinate of the vector 24 is equal to or less than a given value may be used instead of the value L1.

Figure 10A:
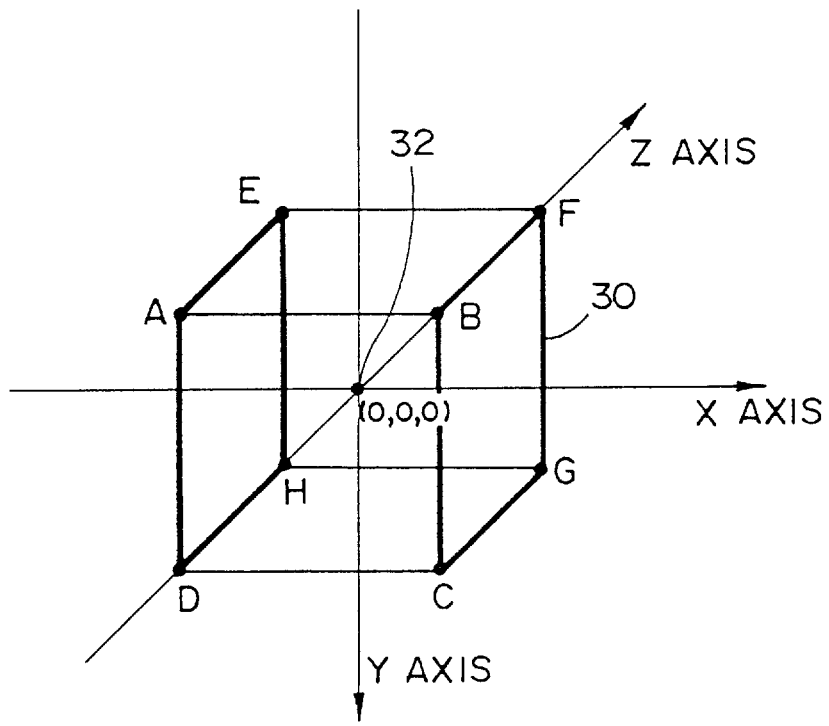
FIGS. 10A and 10B illustrate the coordinate transformations in the local coordinate system, world coordinate system and screen coordinate system.
Figure 10B:
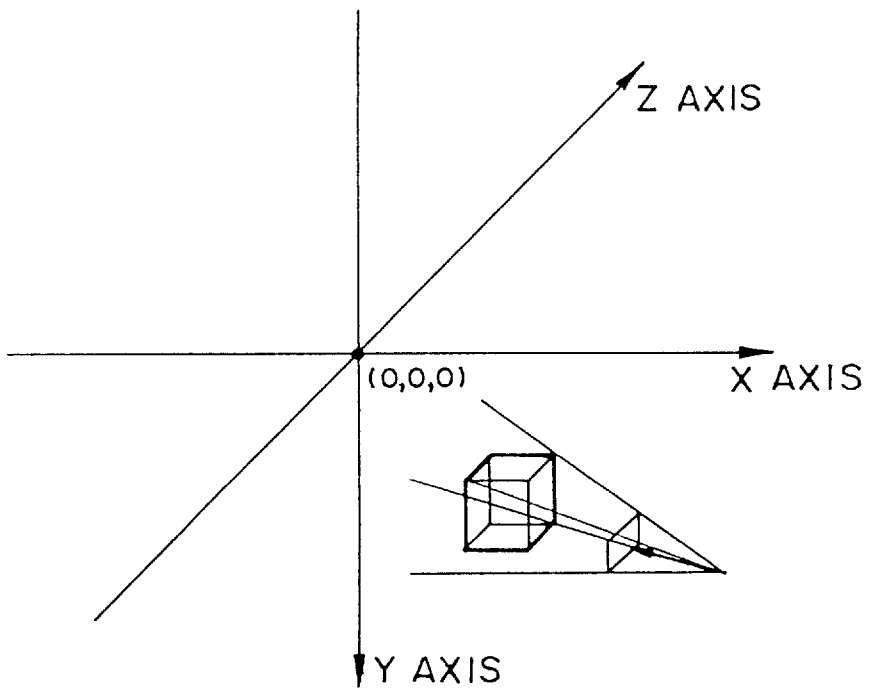

If it is judged that the distance L1 is larger than the given value, the normal process that transforms the vertex position of the polygon from the local coordinate system to the world coordinate system is then carried out. Thereafter, the vertex position is transformed to the screen coordinate system (step S2). This step is called "perspective transformation". As shown in FIG. 10A, for example, the positional data of the vertices A to H of the polygon defining the first object 30 in the local coordinate system have been stored in a given storage means within the game apparatus in the form of such a table data as shown in FIG. 9A. The positional data of the representative point 32 of the first object 30 in the world coordinate system can be given from the table data shown in FIG. 9A. Therefore, the vertex position data of the polygon in the world coordinate system can be determined from the vertex position data of the polygon defining the first object in the local coordinate system and also from the positional data of the representative point in the world coordinate system. By perspectively transforming the vertex position data of the polygon in the world coordinate system as shown in FIG. 10B, the vertex position data of the polygon in the screen coordinate system can be obtained. The resulting vertex position data of is stored in a column F in FIG. 9B.

Then, the depth coordinate of the polygon is determined (step S3). This embodiment determines an average value relating to the depth coordinates of plural vertices in the polygon, such an average value being then used as the depth coordinate of the polygon itself. Instead of the average value, the minimum or maximum value may be used as the depth coordinate of the polygon. The determined depth coordinate of the polygon is then stored in a column G in FIG. 9B. Such a process will be carried out for all the polygons defining the object (step S4).

On the other hand, if it is judged that the distance L1 is equal to or less than the given value, the representative point 32 is moved so that the distance between the representative point 32 and the viewpoint 20 becomes N times larger (step S5). The vertex position of the polygon is transformed from the local coordinate system to the world coordinate system before it is transformed to the screen coordinate system (step S6).

Unlike the step S2, however, the step S6 uses such a vertex position data being used for enlarging the object as shown in FIG. 9B. In other words, the vertex position data for enlarging the object is used in place of the normal vertex position data when the vertex position of the polygon is transformed from the local coordinate system to the world coordinate system. Thus, a second object N times as large as the first object can be located at the representative point after it has been moved. When the shape data of the second object N times larger than the first object has been previously provided, any process for enlarging the first object may be omitted. Thus, the entire process can be improved in processing speed while maintaining the real-time property in the process. It is, however, desirable that the process for enlarging the first object as large as N times is performed in real time when the memory capacity should preferentially be saved.

Subsequently, the depth coordinate of the polygon is determined and magnified 1/N times (step S7). In other words, the average value relating to the depth coordinates of the plural vertices in the polygon is determined and magnified 1/N times, the resulting value being then stored in the column G of FIG. 9B. When the 1/N times depth coordinate is used to perform the drawing, such a proper view image as shown in FIG. 5B may be provided even if the first, second and third objects (30, 40, 44) are in such a positional relationship as shown in FIG. 5A. Such a process is performed to all the polygons defining the object (step S8). Finally, it is judged whether the process has been carried out for all the objects to be processed (step S9).

Figure 8:
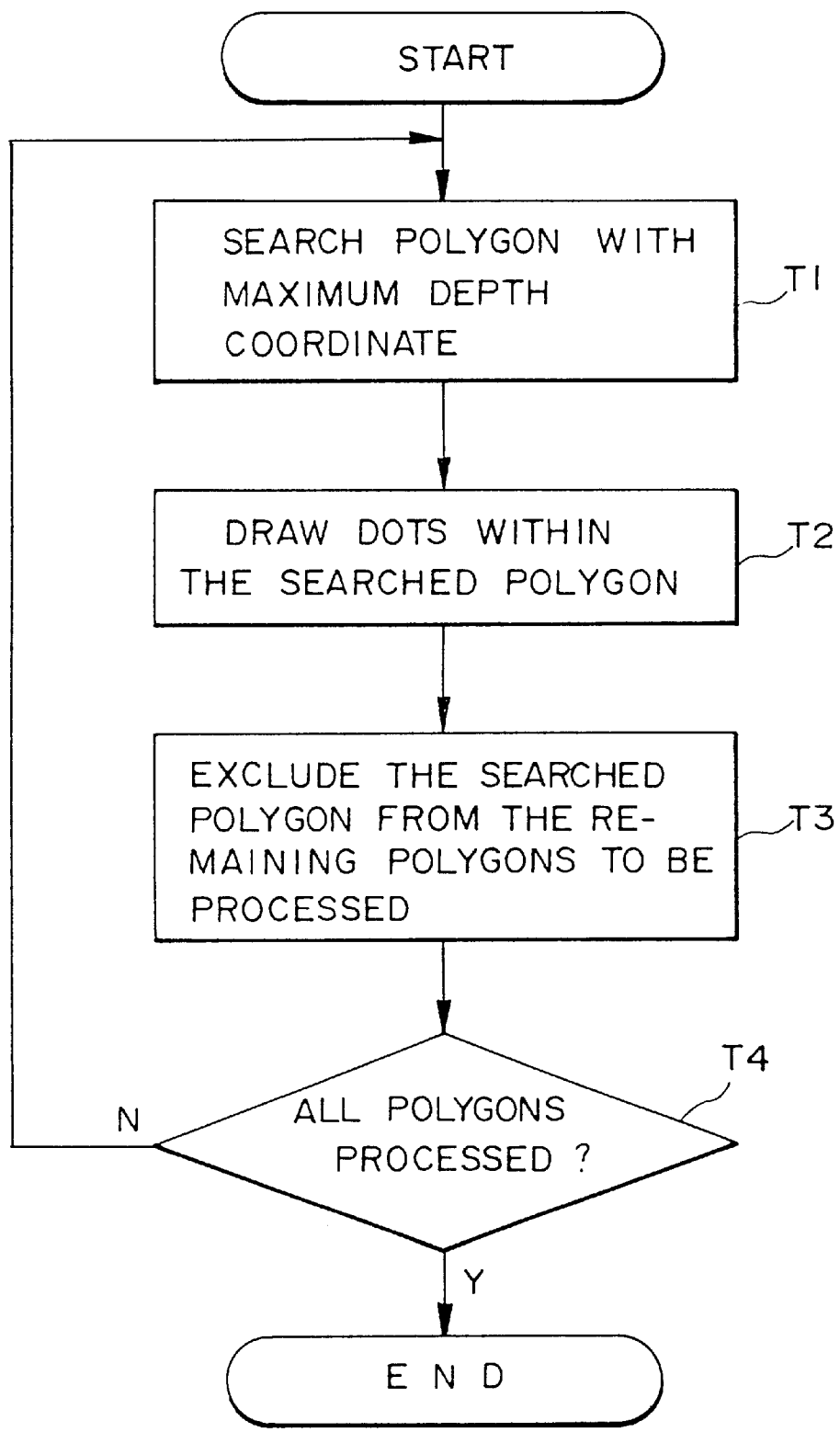
FIG. 8 is a flowchart illustrating the details of the other operational steps of this embodiment.

FIG. 8 shows a flowchart illustrating a polygon drawing operation. First of all, the table data shown in FIG. 9B are used to search a polygon having the largest depth coordinate to be stored in the column G (step T1). Dots in the searched polygon are then drawn (step T2). The searched or drawn polygon is removed out of the searching process (step T3). Such steps T1 to T3 will be repeated until all the polygons have been processed (step T4).

As will be apparent from the foregoing, this embodiment uses the drawing technique that overwrites polygons one over another subsequently starting from the farthest polygon from the viewpoint. However, this embodiment is not limited to such a drawing process as shown in FIG. 8. For example, the depth coordinate may be directly transformed to an address. Then the drawing may be processed to polygons subsequently starting from the polygon of which depth coordinate has been transformed to the largest address. Furthermore, the depth coordinate of a dot may be determined in place of the polygon. Then the drawing in accordance with any hidden surface removal technique such as Z buffer method is performed.

Figure 11:
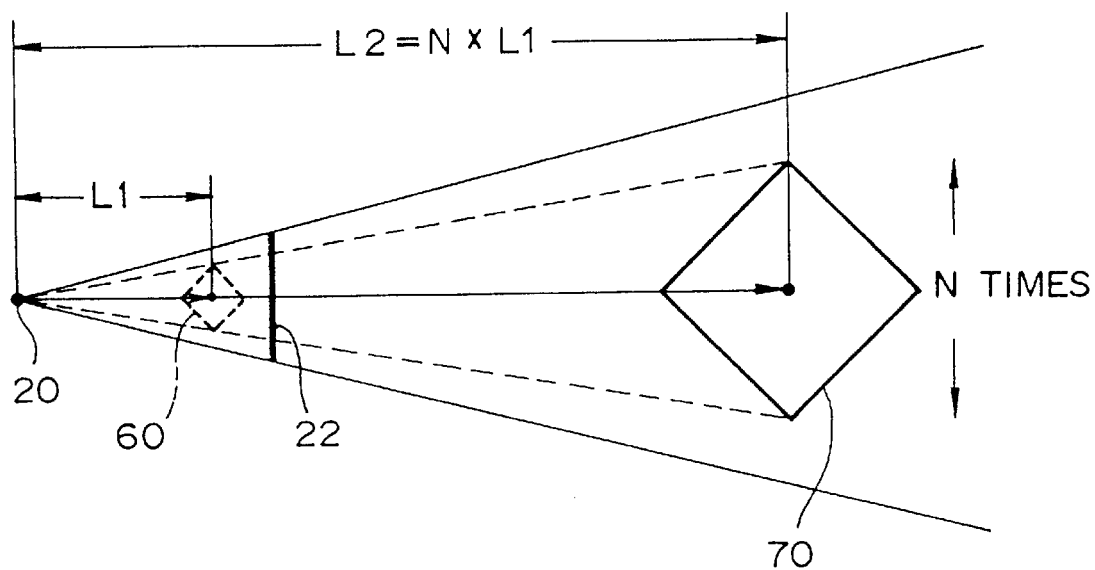
FIG. 11 illustrates a polygon being processed.

Although the case which the objects is processed have been mainly described with reference to FIG. 2, this embodiment is not limited to this case, but may be similarly any other matter can be processed instead of the object. For example, as shown in FIG. 11, the polygon 70 having its magnitude N times larger than that of the polygon 60 may be located at a position spaced away from the viewpoint 20 by the distance L2=N×L1. In place of the polygon, further, any curved surface such as a free-form surface may be processed according to this embodiment.

Figure 12:
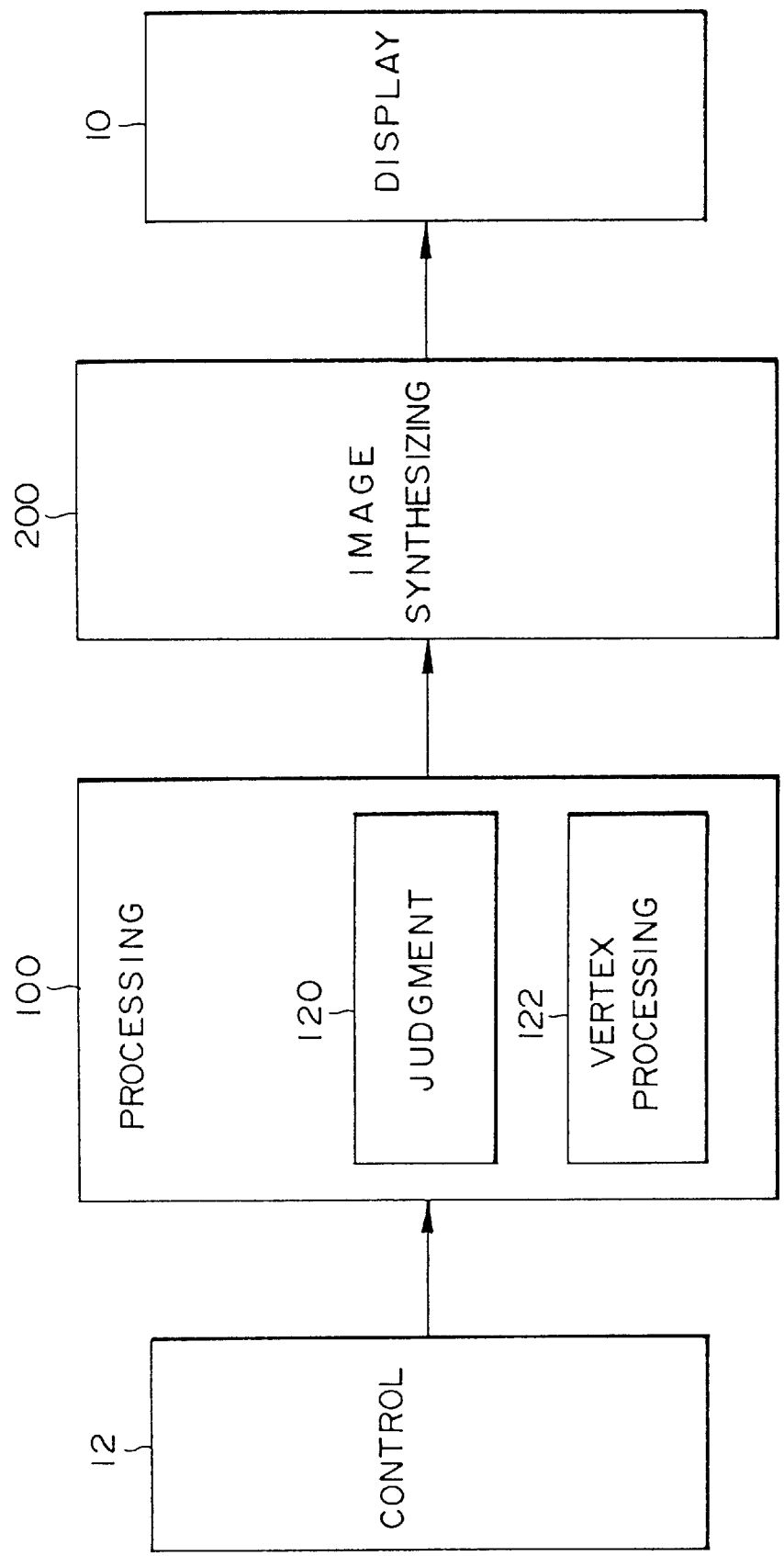
FIG. 12 is a functional block diagram of a three-dimensional game apparatus which can realize a technique for moving the vertex.

Instead of moving the representative point of the object or the like, vertices defining an object or the like may be directly moved. FIG. 12 shows a functional block diagram of a three-dimensional game apparatus utilizing such a technique. A processing section 100 comprises a judgment section 120 and a vertex processing section 122. The judgment section 120 judges whether or not the vertex of a first object, polygon or curved surface is located at a position nearer the viewpoint. When it is judged that the vertex is located at a position near the viewpoint, the vertex processing section 122 moves the vertex to a position in which the distance between the vertex and the viewpoint becomes N times larger than the original distance.

Figure 13A:
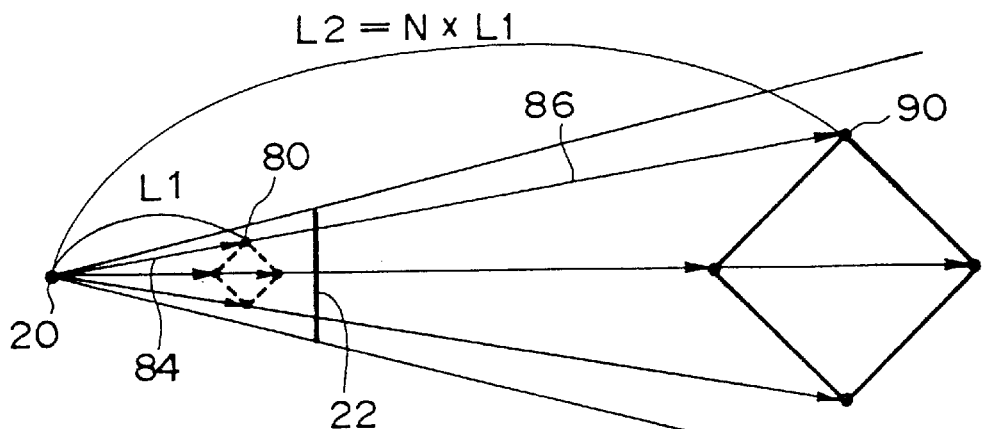
FIGS. 13A, 13B and 13C illustrate the technique for moving the vertex.

More particularly, the judgement section 120 judges whether or not the length L1 of a vector 84 (third vector) including the viewpoint 20 as a starting point and a vertex 80 as a terminal point is equal to or less than a given value, as shown in FIG. 13A. When it is judged that the length L1 of the vector 84 is equal to or less than the given value, the vertex processing section 122 moves the vertex to the terminal point of a vector 86 (fourth vector) including the viewpoint 20 as a starting point and having the same direction as that of the vector 84 and the length N times as long as that of the vector 84. In other words, the vertex 80 is moved to a position of a vertex 90. Thus, any distortion in image can be overcome as in FIG. 2 while an object or the like located very near the viewpoint can be displayed. This can provide an image with improved reality.

Figure 13B:
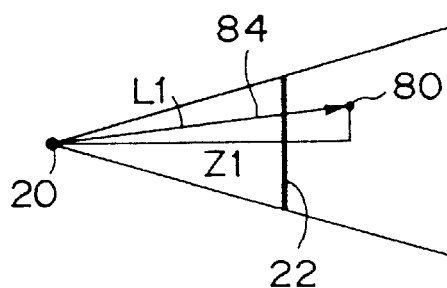
Figure 13C:
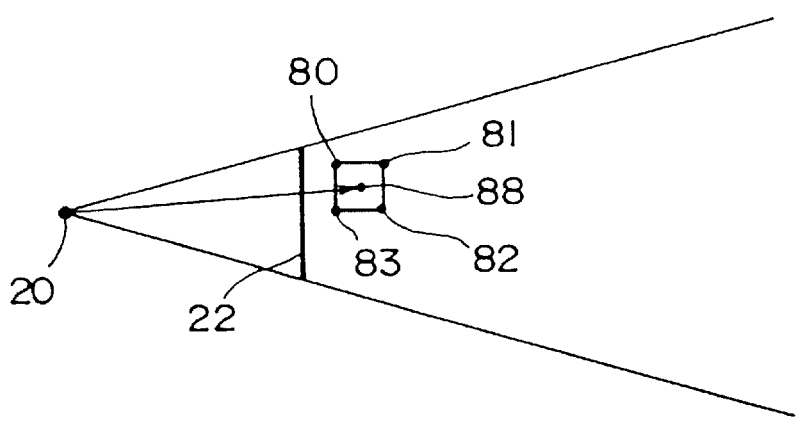

In FIG. 13A, it is judged whether or not the vertex 80 is nearer the viewpoint 20 based on the length L1 of the vector 84. However, any other suitable techniques may be applied to the present invention such as performing the judgment based on the depth coordinate Z1 of the vector 84 as shown in FIG. 13B or performing the judgement based on the distance between a point 88 specified by a plurality of vertices 80, 81, 82 and 83 and the viewpoint 20 as shown in FIG. 13C.

Also in the technique that moves the vertices, it is desirable that the second object, polygon or curved surface defined by the moved vertices is drawn with substantially the same drawing priority as that of the first object, polygon or curved surface defined by the non-moved vertices.

Figure 14:
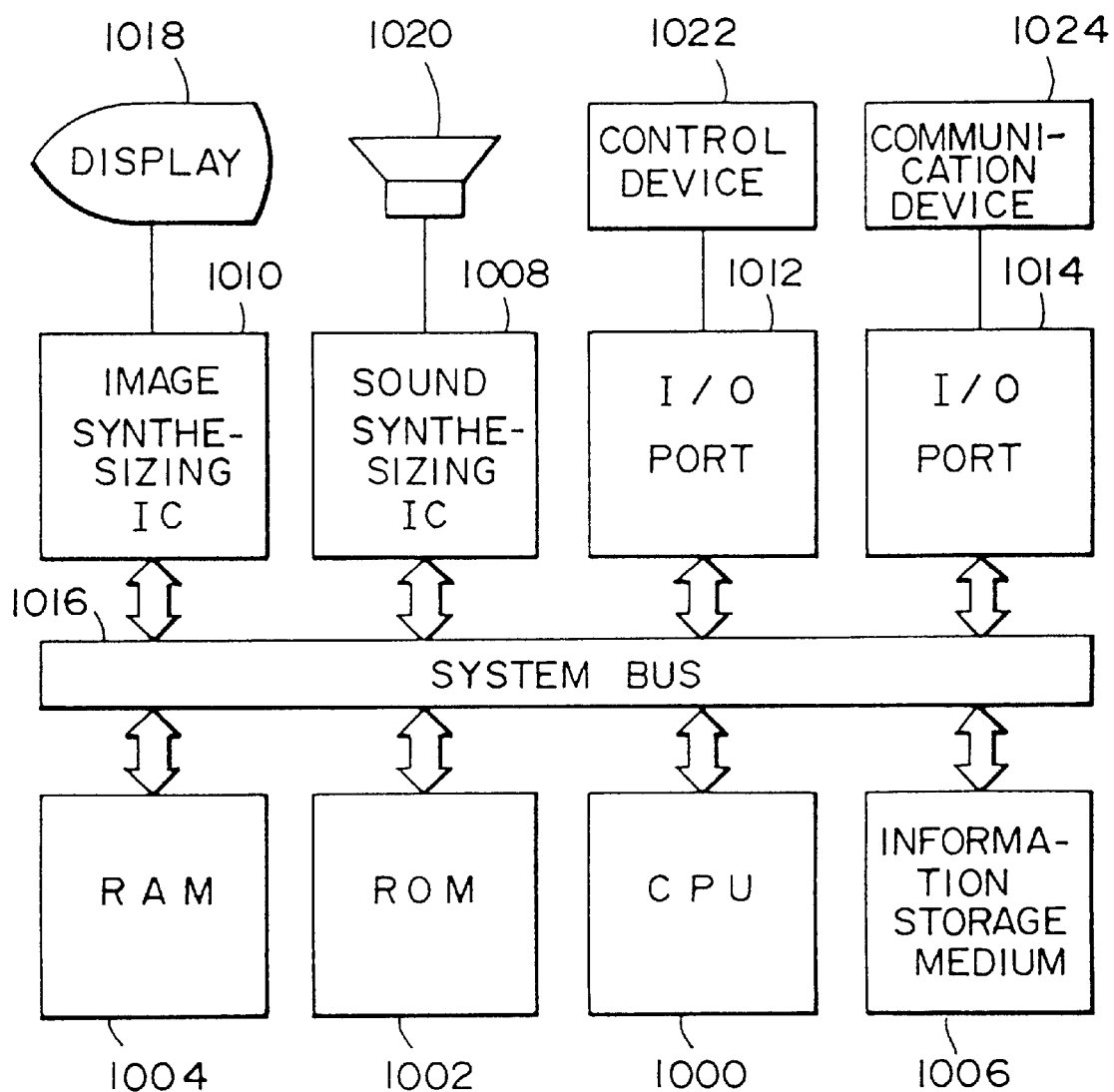
FIG. 14 is a block diagram of hardware to realize in this embodiment.

A hardware structure that can accomplish this embodiment a will be described with reference to FIG. 14. The structure comprises a CPU 1000, a ROM 1002, a RAM 1004, an information storage medium 1006, a sound synthesizing IC 1008, an image synthesizing IC 1010 and I/O ports 1012 and 1014 all of which are interconnected through a system bus 1016 to be able to transmit and receive data. The image synthesizing IC 1010 is connected to a display 1018; the sound synthesizing IC 1008 is connected to a speaker 1020; the I/O port 1012 is connected to a control device 1022; and the I/O port 1014 is connected to a communication device 1024.

The information storage medium 1006 mainly stores programs, image information for representing display object, sound information and so on and may be in the form of CD-ROM, game cassette, IC card, DVD, MO, FD, memory, hard disc or the like. In the domestic game machine, for example, CD-ROM, game cassette, DVD or the like may be used as the information storage medium. On the other hand, the arcade game machine may use a memory such as ROM. In such a case, ROM 1002 is used as the information storage medium 1006.

The control device 1022 corresponds to a device such as a game controller or a control panel which a player can input the result of judgement carried out corresponding to game progress into the apparatus.

In accordance with a program stored in the information storage medium 1006, a system program stored in the ROM 1002 (which includes information for initializing the apparatus and so on), signals inputted into the control device 1022 and the other data, the CPU 1000 controls the entire apparatus and performs various data processings. The RAM 1004 is a storage means used such as a working area for the CPU 1000 and stores given contents in the information storage medium 1006 or ROM 1002 or the computed results from the CPU 1000. The data structure having such a logical arrangement such as table data shown in FIGS. 9A and 9B will be build up on the RAM or information storage medium.

The game apparatus of such a type further comprises the sound synthesizing IC 1008 and the image synthesizing IC 1010 which can desirably output game sounds and game images. The sound synthesizing IC 1008 is an integrated circuit which synthesizes game sounds such as effect sounds and background music, based on the information stored in the information storage medium 1006 or ROM 1002. The synthesized game sounds may be outputted through the speaker 1020. The image synthesizing IC 1010 is in the form of an integrated circuit which synthesizes pixel information to be outputted toward the display 1018, based on image information from the RAM 1004, ROM 1002, information storage medium 1006 and the like. A so-called head-mount display (HMD) may be used as the display 1018.

The communication device 1024 transmits and receives various information utilized within the game apparatus to and from the exterior. Thus, the communication device 1024 may be connected to any other game apparatus to transmit and receive given information corresponding to the game program, and transmit and receive information such as another game program through a communication line.

Figure 15A:
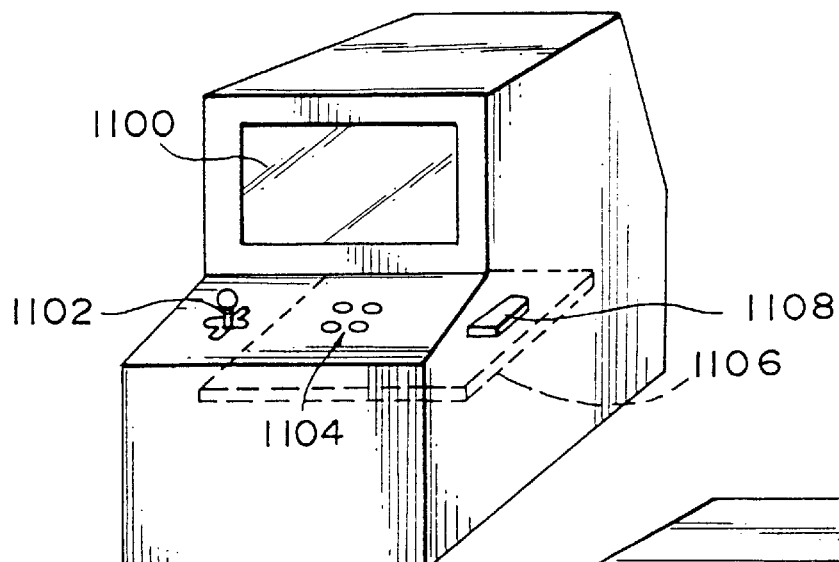
FIGS. 15A, 15B and 15C show various forms of devices to which this embodiment can be applied.

FIG. 15A shows an arcade game apparatus to which this embodiment is applied. A player enjoys a game by manipulating a lever 1102, buttons 1104 and others while viewing a game image projected onto a display 1100. A system board 1106 includes a CPU, an image synthesizing IC, a sound synthesizing IC and others all of which are mounted thereon. Various information is stored in a memory 1108 which is an information storage medium on the system board 1106. Such information includes information for judging whether or not a first object, polygon or curved surface is located at a position near the viewpoint; information for locating a second object or the like which is N times as large as the first object or the like at a position spaced away from the viewpoint by a second distance which is N times as long as a first distance when it is judged that the first object or the like is located at the position near the viewpoint; information for synthesizing a view image including the image of the object; information for judging whether or not the length or the depth coordinate of a first vector including the viewpoint as a starting point and the representative point of the first object or the like as a terminal point is equal to or less than a given value; information for locating the second object or the like so that the terminal point of a second vector is positioned at a representative point of the second object or the like when it is judged that the length or the depth coordinate of the first vector is equal to or less than the given value and so on, the second vector including the viewpoint as a starting point and having the same direction as that of the first vector and the length N times as long as that of the first vector. Such information will be called "stored information". The stored information includes at least one of the program code for performing the above various processes, image information, sound information, shape information of a display object, table data, list data, player information and the like.

Figure 15B:
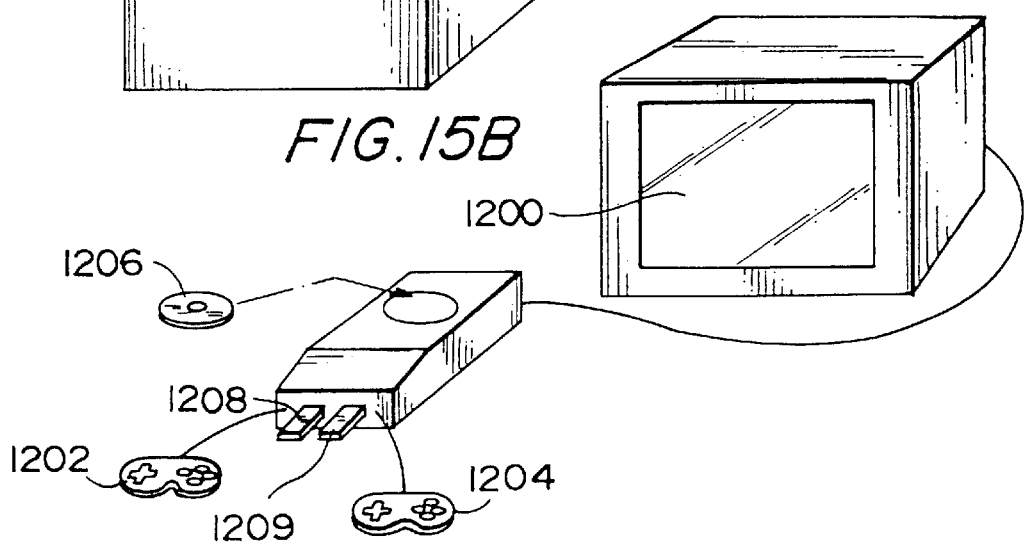

FIG. 15B shows an domestic game machine to which this embodiment is applied. A player enjoys a game by manipulating a game controller 1202, 1204 while viewing a game image projected onto a display 1200. In this case, the aforementioned stored information is stored in the information storage medium, which can be attached to and removed out of the machine body, such as CD-ROM 1206 and IC card 1208, 1209.

Figure 15C:
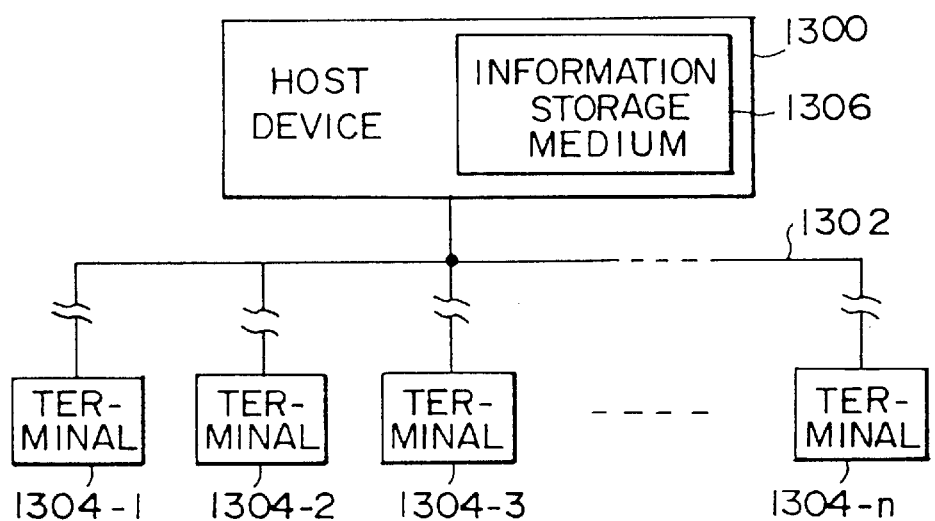
Figure 16A:
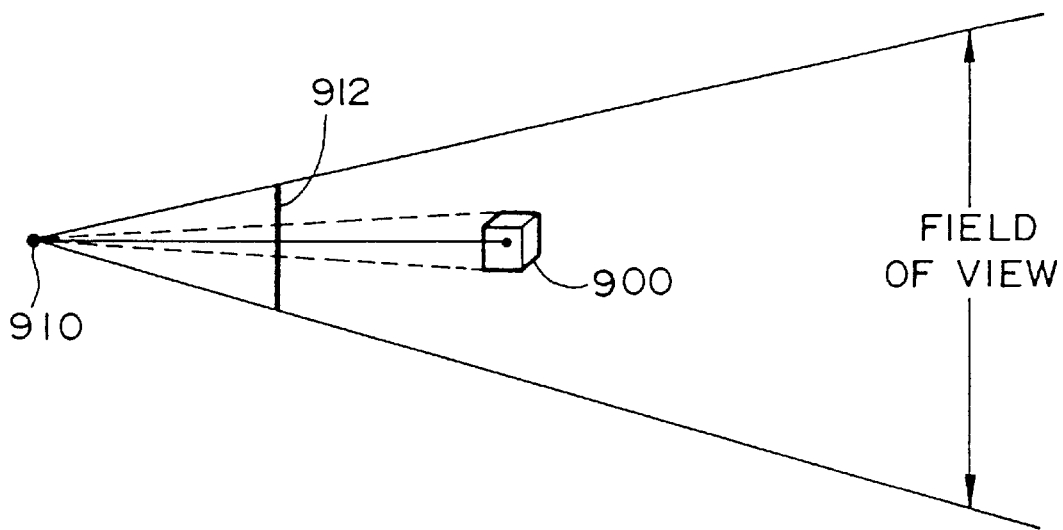
FIGS. 16A and 16B illustrate the problem of an image distortion produced when the object approaches the viewpoint.
Figure 16B:
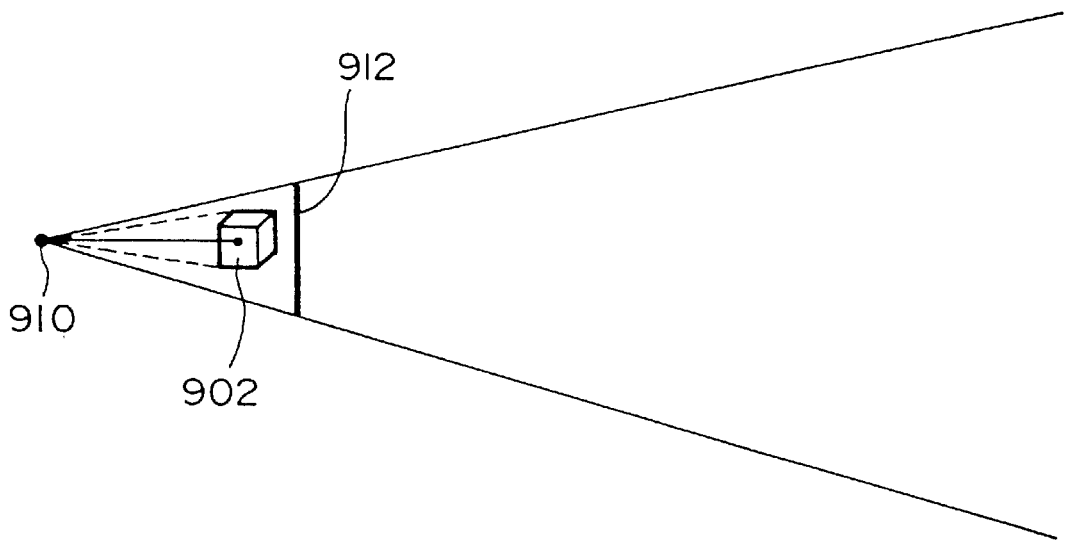

FIG. 15C shows another game apparatus to which this embodiment is applied. The game apparatus comprises a host device 1300 and terminals 1304 through 1304-n which are connected to the host device 1300 through a communication line 1302. In this case, the aforementioned stored information are stored in an information storage medium 1306 such as magnetic disc device, magnetic tape device or memory. These information storage mediums can be controlled by the host device 1300. If each of the terminals 1304 through 1304-n is a stand-alone type which includes a CPU, an image synthesizing IC and a sound synthesizing IC and can solely synthesize game images and game sounds, it is supplied with a game program and the like for synthesizing the game images and sounds from the host device 1300. On the other hand, if each of the terminals is not of stand-alone type, the host device 1300 synthesizes game images and sounds which are in turn transferred to and outputted by the terminals 1304 through 1304-n.

The present invention is not limited to the aforementioned embodiment, but may be carried out in any one of various modified or changed forms.

For example, it is desirable that the technique for judging whether or not the first object, polygon, curved surface or the vertex is located at a position near the viewpoint is one as shown in FIGS. 2, 3A, 3B, 11, 13A to 13C or the like, from the viewpoint of simplicity in the processing. However, this may be replaced by any other suitable technique.

Although the technique for using the representative point to locate the object, polygon or curved surface is desirable from the viewpoint of reduction of the processing load. This can also be replaced by any other suitable technique.

The operation in the processing and image synthesizing sections may not be limited to the operation as described in connection with FIGS. 7 to 10B.

The present invention may be applied not only to the domestic and arcade game machine, but also to various other game machines such as simulators, large-scaled attraction systems in which a number of players can play the game, personal computers, multimedia terminals, system boards for synthesizing game images and so on.

What is claimed is:

1. A three-dimensional game apparatus for synthesizing a view image at a given viewpoint within an object space in which objects are arranged, said apparatus comprising:

means for judging whether or not any one of a first object, a first polygon defining the first object and a first curved surface defining the first object is located at a position near said viewpoint;

means for locating any one of a second object, a second polygon and a second curved surface at another position spaced away from said viewpoint by a second distance when it is judged that any one of said first object, said first polygon and said first curved surface is located at said position near said viewpoint, said second object, said second polygon and said second curved surface being N times as large as said first object, said first polygon and said first curved surface, said second distance being N times as long as a first distance between said viewpoint and any one of said first object, said first polygon and said first curved surface; and means for synthesizing a view image including the images of the objects.

2. The three-dimensional game apparatus according to claim 1 wherein any one of said second object, said second polygon and said second curved surface is located so that the terminal point of a second vector is positioned at a representative point of any one of said second object, said second polygon and said second curved surface when it is judged that any one of the length and the depth coordinate of a first vector is equal to or less than a given value, said first vector including said viewpoint as a starting point and including the representative point of any one of said first object, said first polygon and said first curved surface as a terminal point, said second vector including said viewpoint as a starting point and having the same direction as that of said first vector and having the length N times as long as that of said first vector.

3. The three-dimensional game apparatus according to claim 2 wherein any one of said second object, said second polygon and said second curved surface is drawn with substantially the same drawing priority as that of any one of said first object, said first polygon and said first curved surface.

4. The three-dimensional game apparatus according to claim 3 wherein said drawing is performed based on the depth coordinate 1/N times the depth coordinate of any one of said second object, said second polygon and said second curved surface.

5. The three-dimensional game apparatus according to claim 3 wherein said drawing is performed based on the depth coordinate of any one of said first object, said first polygon and said first curved surface.

6. The three-dimensional game apparatus according to claim 2 wherein any one of said second object, said second polygon and said second curved surface formed based on the previously provided shape data is located at a position spaced away from the viewpoint by said second distance.

7. The three-dimensional game apparatus according to claim 2 wherein any one of said first object, said first polygon and said first curved surface is moved to a position spaced away from the viewpoint by said second distance, at the same time, enlarged N times.

8. The three-dimensional game apparatus according to claim 1 wherein any one of said second object, said second polygon and said second curved surface is drawn with substantially the same drawing priority as that of any one of said first object, said first polygon and said first curved surface.

9. The three-dimensional game apparatus according to claim 8 wherein said drawing is performed based on the depth coordinate 1/N times the depth coordinate of any one of said second object, said second polygon and said second curved surface.

10. The three-dimensional game apparatus according to claim 8 wherein said drawing is performed based on the depth coordinate of any one of said first object, said first polygon and said first curved surface.

11. The three-dimensional game apparatus according to claim 1 wherein any one of said second object, said second polygon and said second curved surface formed based on the previously provided shape data is located at a position spaced away from the viewpoint by said second distance.

12. The three-dimensional game apparatus according to claim 1 wherein any one of said first object, said first polygon and said first curved surface is moved to a position spaced away from the viewpoint by said second distance, and at the same time, enlarged N times.

13. A three-dimensional game apparatus for synthesizing a view image at a given viewpoint within an object space in which objects are arranged, said apparatus comprising:

means for judging whether or not the vertex of any one of a first object, a first polygon defining the first object and a first curved surface defining the first object is located at a position near said viewpoint;

means for moving said vertex so that the distance between said vertex and said viewpoint becomes N times as long as the original distance when it is judged that said vertex is located at a position near said viewpoint; and means for synthesizing a view image including the images of the objects.

14. The three-dimensional game apparatus according to claim 13 wherein said vertex is moved to the terminal point of a fourth vector when it is judged that any one of the length and the depth coordinate of a third vector is equal to or less than a given value, said third vector including said viewpoint as a starting point and including a point specified by said vertex as a terminal point, said fourth vector including said viewpoint as a starting point and having the same direction as that of said third vector and having the length N times as long as that of said third vector.

15. The three-dimensional game apparatus according to claim 14 wherein any one of a second object, a second polygon and a second curved surface which is defined by the moved vertex is drawn with substantially the same drawing priority as that of any one of said first object, said first polygon and said first curved surface.

16. The three-dimensional game apparatus according to claim 13 wherein any one of a second object, a second polygon and a second curved surface which is defined by the moved vertex is drawn with substantially the same drawing priority as that of any one of said first object, said first polygon and said first curved surface.

17. An information storage medium for synthesizing a view image at a given viewpoint within an object space in which objects are arranged, said information storage medium comprising:

information for judging whether or not any one of a first object, a first polygon defining the first object and a first curved surface defining the first object is located at a position near said viewpoint;

information for locating any one of a second object, a second polygon and a second curved surface at another position spaced away from said viewpoint by a second distance when it is judged that any one of said first object, said first polygon and said first curved surface is located at said position near said viewpoint, said second object, said second polygon and said second curved surface being N times as large as said first object, said first polygon and said first curved surface, said second distance being N times as long as a first distance between said viewpoint and any one of said first object, said first polygon and said first curved surface; and information for synthesizing a view image including the images of the objects.

18. The information storage medium according to claim 17 wherein any one of said second object, said second polygon and said second curved surface is located so that the terminal point of a second vector is positioned at a representative point of any one of said second object, said second polygon and said second curved surface when it is judged that any one of the length and the depth coordinate of a first vector is equal to or less than a given value, said first vector including said viewpoint as a starting point and including the representative point of any one of said first object, said first polygon and said first curved surface as a terminal point, said second vector including said viewpoint as a starting point and having the same direction as that of said first vector and having the length N times as long as that of said first vector.

19. The information storage medium according to claim 17 wherein any one of said second object, said second polygon and said second curved surface is drawn with substantially the same drawing priority as that of any one of said first object, said first polygon and said first curved surface.

20. The information storage medium according to claim 17 wherein any one of said second object, said second polygon and said second curved surface formed based on the previously provided shape data is located at a position spaced away from the viewpoint by said second distance.

21. The information storage medium according to claim 17 wherein any one of said first object, said first polygon and said first curved surface is moved to a position spaced away from the viewpoint by said second distance, and at the same time, enlarged N times.

22. An information storage medium for synthesizing a view image at a given viewpoint within an object space in which objects are arranged, said information storage medium comprising:

information for judging whether or not the vertex of any one of a first object, a first polygon defining the first object and a first curved surface defining the first object is located at a position near said viewpoint;

information for moving said vertex so that the distance between said vertex and said viewpoint becomes N times as long as the original distance when it is judged that said vertex is located at a position near said viewpoint; and information for synthesizing a view image including the images of the objects.

23. The information storage medium according to claim 22 wherein said vertex is moved to the terminal point of a fourth vector when it is judged that any one of the length and the depth coordinate of a third vector is equal to or less than a given value, said third vector including said viewpoint as a starting point and including a point specified by said vertex as a terminal point, said fourth vector including said viewpoint as a starting point and having the same direction as that of said third vector and having the length N times as long as that of said third vector.

24. The information storage medium according to claim 22 wherein any one of a second object, a second polygon and a second curved surface which is defined by the moved vertex is drawn with substantially the same drawing priority as that of any one of said first object, said first polygon and said first curved surface.

* * * * *